(12) United States Patent
Ehmann et al.

(10) Patent No.: US 11,271,382 B2
(45) Date of Patent: Mar. 8, 2022

(54) CABLE LEAD-THROUGH HAVING A SEPARABLE FRAME

(71) Applicant: ICOTEK PROJECT GMBH & CO. KG, Mogglingen (DE)

(72) Inventors: Bruno Ehmann, Mogglingen (DE); Valentin Ehmann, Schwabisch Gmund (DE)

(73) Assignee: ICOTEK PROJECT GMBH & CO. KG, Mögglingen (DE)

( * ) Notice: Subject to any disclaimer, the term of this patent is extended or adjusted under 35 U.S.C. 154(b) by 66 days.

(21) Appl. No.: 16/464,140

(22) PCT Filed: Nov. 27, 2017

(86) PCT No.: PCT/EP2017/080484
§ 371 (c)(1),
(2) Date: May 24, 2019

(87) PCT Pub. No.: WO2018/096136
PCT Pub. Date: May 31, 2018

(65) Prior Publication Data
US 2020/0295554 A1   Sep. 17, 2020

(30) Foreign Application Priority Data
Nov. 25, 2016 (DE) .......................... 102016223425.0

(51) Int. Cl.
*H02G 3/22* (2006.01)
(52) U.S. Cl.
CPC ..................... *H02G 3/22* (2013.01)
(58) Field of Classification Search
CPC .. H02G 3/22; H02G 3/24; H02G 3/26; H02G 3/30; H02G 3/36; H02G 15/007;
(Continued)

(56) References Cited

U.S. PATENT DOCUMENTS 1,133,976 A   3/1915   Kraus
2,417,260 A   3/1947   Morehouse
(Continued)

FOREIGN PATENT DOCUMENTS

DE   3000670 A1   7/1980
DE   3610353      9/1995
(Continued)

OTHER PUBLICATIONS

International Search Report and Written Opinion for PCT/EP2017/080484, dated Jan. 18, 2018, 9 pages.
(Continued)

*Primary Examiner* — Angel R Estrada
(74) *Attorney, Agent, or Firm* — Faegre Drinker Biddle & Reath LLP

(57) ABSTRACT

The invention relates to a cable lead-through, comprising: a separable frame having at least two longitudinal strips and two side strips, which are positioned together in a plane perpendicular to the direction of travel of the lead-through cable; spacer elements positioned between the longitudinal strips, of which at least one forms an intermediate space between, itself and a neighbouring spacer element or one of the side strips, which is designed for receiving at least one grommet, which in turn has at least one hole for leading through the cable. The invention is characterised by the following features each of the longitudinal strips has a plurality of holes or recesses on at least the side thereof facing the respective other longitudinal side; in the region of at least one of the front side ends, each spacer element corresponds to the holes or the recesses in the longitudinal strips, such that the spacer elements can be introduced into the holes or recesses transverse to the direction of travel of the lead-through cable.

22 Claims, 7 Drawing Sheets

(58) Field of Classification Search
CPC .... H02G 15/04; H02G 3/083; B60R 16/0222; B60R 16/0215
USPC .... 174/650, 151, 135, 152 G, 153 G, 152 R, 174/659, 664, 137, 155, 156; 248/74.1, 248/74.2, 74.3, 68.1, 65, 49, 56; 16/2.1, 16/2.2; 385/134, 135
See application file for complete search history.

(56) References Cited

U.S. PATENT DOCUMENTS

| | | | | |
|---|---|---|---|---|
| 2,732,226 | A | * | 1/1956 | Brattberg .............. H02G 3/22 248/56 |
| 4,291,195 | A | | 9/1981 | Blomqvist et al. |
| 4,419,535 | A | * | 12/1983 | O'Hara ................ H02G 3/22 169/48 |
| 5,416,271 | A | * | 5/1995 | Birmingham .......... F16L 5/08 174/657 |
| 7,806,374 | B1 | | 10/2010 | Ehmann et al. |
| 8,093,513 | B2 | * | 1/2012 | Elm ..................... F16L 5/14 174/650 |
| 8,602,931 | B2 | | 12/2013 | Fujiwara |
| 8,674,240 | B2 | * | 3/2014 | Karlsson .............. F16L 5/14 174/657 |
| 8,963,010 | B2 | * | 2/2015 | Sprenger ............. H02G 3/22 174/151 |
| 10,298,001 | B2 | * | 5/2019 | Nowastowski-Stock ............... H02G 1/06 |
| 10,574,048 | B2 | * | 2/2020 | Nowastowski-Stock ............... H02G 3/22 |
| 2018/0301883 | A1 | | 10/2018 | Nowastowski-Stock |

FOREIGN PATENT DOCUMENTS

| | | |
|---|---|---|
| DE | 102005002597 B3 | 8/2006 |
| DE | 102007060100 | 6/2009 |
| DE | 102011001868 | 10/2011 |
| DE | 202015102280 | 5/2016 |
| EP | 2746634 | 6/2014 |
| GB | 2040107 A | 8/1980 |
| JP | S55-097115 A | 7/1980 |
| JP | S62-078028 U | 5/1987 |
| JP | H04-025417 U | 2/1992 |
| JP | 2000-092666 A | 3/2000 |
| JP | 2004-096983 A | 3/2004 |
| JP | 2008-510943 A | 4/2008 |
| WO | 2001/042046 | 11/2000 |
| WO | 2006/021567 A1 | 3/2006 |
| WO | 2014/180993 | 5/2014 |
| WO | 20160177364 | 11/2016 |

OTHER PUBLICATIONS

International Preliminary Report on Patentability received for PCT Patent Application No. PCT/EP2017/080484, dated Jun. 6, 2019, 14 pages (8 pages of English Translation and 6 pages of Original Document).

Japan Patent Office, Office Action for Japanese Patent Application No. 2019-548764, dated Sep. 27, 2021.

* cited by examiner

CABLE LEAD-THROUGH HAVING A SEPARABLE FRAME

CROSS-REFERENCE TO RELATED APPLICATION

The present application is a National Stage of International Application No. PCT/EP2017/080484, filed Nov. 27, 2017, and which claims priority to DE 10 2016 223 425.0, filed Nov. 25, 2016, the entire disclosures of which are hereby expressly incorporated herein by reference.

The invention relates to a cable lead-through having a separable frame of the kind defined in greater detail according to the preamble of claim 1.

Cable lead-throughs of this kind or also cable holders are used to collate and hold a number of cables or other lines that are inserted in grommets. The frame is separable here and, for example, is U-shaped. It then has, accordingly, two side strips and a longitudinal strip connecting these two side strips to one another. A second longitudinal strip or a second U-shaped frame as a cover close the structure. Partition walls are provided within the frame, between which partition walls the grommets are received. The grommets receivable in the frame have at least one hole for guiding through a cable. The grommets are made of resilient material. The individual grommet often has a slit so that the grommet can be folded open or splayed in order to insert the cable easily. Cables which are already provided with plugs can thus also be easily inserted as a result. The grommets populated with cables are then inserted in the interior of the frame and fill it. The frame is then closed by the cover. This exerts a pressure onto the grommets so that all of the grommets populated with cables are compressed within the frame, thus resulting in a good seal.

Document WO 01/42046 A2 presents a structure of this kind with two-part or multi-part frames, which can be closed by being screwed shut. Document EP 2 746 634 A1 describes frames that can be closed by a clipped connection. A similar structure is also described in WO 2014/180993 A1. A further variant hereof is also described in DE 10 2011 001 868 A1.

U.S. Pat. No. 2,417,260 describes a similar embodiment from which a cover is evident, which rests on a side of the U-shaped frame and is securely connected to the side by a screw. In the assembled state the grommets with the cables inserted therein are again clamped in this case too.

Document WO 2016/0177364 A1 also presents an arrangement for guiding a plurality of cables through a wall. This arrangement has a frame that is non-separable in the plane transverse to the direction of travel of the cables, wherein the grommets are placed in an existing cross-shaped or double-cross-shaped element formed from individual partition walls. The inserted cables inclusive of the grommets and the double-cross-shaped element are then inserted into the non-separable frame, more specifically in the direction of travel of the cables. The frame is then sealed by a separated terminating cover, again in the direction of travel of the inserted cables. This is extremely complex in respect of the assembly effort.

A substantially similar technique is also known from DE 10 2007 060 100 A1. Here, individual elements are inserted into a non-separated frame in the direction of travel of the cables and are clipped to the frame. As a result, the cover closing the frame in the direction of travel of the cables, necessary in the above-mentioned WO document, can be spared.

A disadvantage in most of the prior art documents is the fact that the individual frames or the crosses or double crosses inserted in the direction of travel of the cables have to be manufactured in accordance with the grommets used. If different grommets are to be used during the assembly, for example in the case of assembly on a switch cabinet which is constructed on-site, the installer must then take with him a large number of different frames or crosses or double crosses in order to be able to meet the various requirements of the assembly of the cable lead-through. This is associated with considerable logistical effort for the installer. Since the parts are produced typically by means of injection moulding, the production is also associated with a significant effort and high costs, since costly tools are necessary in order to produce injection-moulded parts, as is known. If multiple individual injection-moulded parts are to be produced, the tool costs are then very high and the produced frames are costly accordingly.

The object of the invention is to design a cable lead-through according to the preamble of claim 1 in such a way that it can be assembled even more easily and efficiently.

This object is achieved with a cable lead-through according to claim 1. Advantageous embodiments and developments shall become clear from the claims dependent on claim 1.

The cable lead-through according to the invention provides a separable frame formed from at least two longitudinal strips and at least two side strips, comparable to the structures in the prior art. The longitudinal strips and side strips together span a plane perpendicular to the direction of travel of the led-through cable. Between the longitudinal strips there are positioned spacer elements, of which at least one forms an intermediate space between itself and the neighbouring spacer element or one of the side strips. This intermediate space is designed to receive at least one grommet, which is known from the prior art. This grommet, which is usually formed from resilient material and has at least one hole for leading through a cable, can additionally be provided with a slit between the hole and the peripheral edge so that it can be folded open in order to insert the cable easily and efficiently and in particular so as to also be able to receive prefabricated cables that have plugs.

In practice these grommets are provided as elements quasi standardised in respect of their grid pitch. It is hereby possible to use different grommets within the same frame. Previously, this required frames with differently arranged spacer elements. In order to remedy this problem, it is provided in accordance with the invention that each of the longitudinal strips now has a plurality of holes or recesses on at least the side thereof facing the respective other longitudinal strip. Each spacer element corresponds here, at least in the region of at least one of its end-face ends, with the holes or recesses in the longitudinal strips, so that the spacer elements can be inserted into the holes or recesses transverse to the direction of travel of the led-through cable.

One or more of the spacer elements, in the cable lead-through designed in accordance with the invention, can thus be introduced into the frame, which does not have to have any spacer elements beforehand. In the holes or recesses the spacer elements can then thus be introduced into the longitudinal strips in a direction oblique or preferably parallel to the side strips. By means of the plurality of holes or recesses it is possible to arrange the spacer elements in different positions along the width of the frame, that is to say at a different distance from one another or from the side strips of the separated frame. As a result, the intermediate spaces between the spacer elements and/or a spacer element and the side strips can be adapted on-site at the time of assembly, such that the corresponding grommets can be reliably received. The installer to this end must merely carry with him the frame and a certain number of spacer elements, which in principle are all of the same design however, or, in accordance with an advantageous development of the concept, are of different lengths. Practically any assembly task can thus be performed with few individual parts, and different kinds of grommets can be received on-site in the cable lead-through very easily and efficiently.

A very favourable embodiment of the cable lead-through provides here that each spacer element is provided on at least one of its sides facing the longitudinal strips with pins or insertion strips which correspond to the holes or recesses in the longitudinal strips. The spacer element, alternatively to the insertion of the entire spacer element into the corresponding recess or hole, may thus also comprise pins or insertion strips so that the spacer element can be inserted into the holes or recesses by means of these pins or insertion strips. As a result, the actual end faces, which carry the pins or insertion strips, typically come to rest against the longitudinal strip, so that a reliable positioning of the spacer element heightwise is ensured, regardless of the depth of the hole or recess.

In accordance with an advantageous development of the concept it is provided that the holes or recesses in the longitudinal strips are designed such that material of the longitudinal strip remains between the holes or the recesses and both outer edges of the longitudinal strip in the direction of travel of the led-through cable. The holes are thus placed within the material of the longitudinal strip, or the recesses are embodied for example in the form of grooves, which are not open-edged however. It is hereby ensured that the spacer elements can be inserted only in the insertion direction transverse to the direction of travel of the cables. The non-open-edged holes and recesses allow here, on the one hand, a very good seal of the structure, such that the opening provided for the cable lead-through, for example the opening in the wall of a switch cabinet, is reliably sealed by the frame with grommets inserted therein and compressed in the frame. On the other hand, the holes or recesses devoid of open edges in both directions also enable good strain relief, in particular if the grommets, as is generally known and conventional, bear against the side strips and the spacer elements by way of a form fit, such that at the same time a strain relief is provided by means of the grommets. In contrast to the structures from the prior art, here the non-open-edged recesses and holes reliably guarantee that no movement of the spacer elements can occur in the direction of travel of the cables, i.e. in the axial direction thereof.

A further very advantageous embodiment of the cable lead-through also provides that the holes are designed as blind-bore holes or the recesses are designed as recesses that do not pass through the material of the longitudinal strip. It is hereby ensured that the structure remains sealed within itself transverse to the direction of travel of the cable, and that through-grooves, through-holes or the like are not critical to the seal of the structure.

A further very advantageous embodiment of the cable lead-through provides that the geometric dimensions or the shaping of the mutually corresponding end-face ends, pins and holes or insertion strips and recesses are/is configured such that the inserted spacer elements have a tight fit in one of the longitudinal strips. This embodiment, for example since the dimensions are selected such that a tight fit in the sense of a press fit is provided, on the one hand enables a good seal and on the other hand allows the insertion of the spacer elements into one of the longitudinal strips and the subsequent insertion of the grommets and the cables into this structure without any risk of the spacer elements releasing again from their inserted position during the assembly, which would significantly increase the assembly effort. The spacer elements then have a looser fit in the sense of a clearance fit in the other of the longitudinal strips. It can hereby be ensured, when one of the longitudinal strips is released, for example in order to disassemble again part of the assembled cables, that the spacer elements in the other longitudinal strip remain in position by way of the tight fit, such that the structure also can be easily disassembled and reassembled accordingly, without the "inner workings" of the frame being able to fall out during the assembly.

In accordance with a further very favourable embodiment hereof it may be provided additionally alternatively that the tight fit is achieved by means of sealing elements, which, in addition to the mechanical fixing, also ensure an appropriate seal during the assembly, which is a further advantage in respect of the tightness of the overall structure.

An extremely favourable development of the concept also provides that intermediate bases are provided between the side strips or between two of the spacer elements or between one of the side strips and one of the spacer elements. Intermediate bases of this kind can be loosely inserted for example, in order to create additional stability widthwise when populating the frame with the grommets and in order to distribute pressure to the grommets uniformly across all grommets as the frame is closed, such that a very good seal can be attained.

In accordance with a very advantageous development hereof it is provided in particular that intermediate bases are formed between two of the spacer elements or between one of the side strips and one of the spacer elements, such that they cooperate form-fittingly with the spacer elements or the spacer elements and the side strips, at least in the direction of travel of the inserted cables. They therefore cannot be pulled out from the assembled frame in the direction of travel of the cables, and therefore also support ideally the requirements on the frame in respect of the strain relief for the inserted cables.

A further embodiment may also provide that the intermediate bases are formed between the side strips. In this case the intermediate bases are ideally fixedly connected to the side strips or in particular are formed integrally therewith. They then form an intermediate frame, which for example can be inserted accordingly between a U-shaped frame lower part and a U-shaped frame cover, as is known in principle from document WO 01/42046 A2 cited at the outset, for example from FIGS. 9/10. In the variant according to the invention recesses or holes are then provided in the intermediate base, which now forms a type of further longitudinal strip, at least on the two opposite sides facing the respective other longitudinal strips, so as to also be able to insert spacer elements here and complete the structure of the frame in the sense according to the invention.

Furthermore, in accordance with an advantageous development, the spacer elements can have a seal on their end face provided with pins or insertion strips. Thus, not only is the tightness between the pins and the holes or the insertion strips and the recesses guaranteed, but also between the spacer elements and the longitudinal strip, so that a further advantage in respect of the seal of the structure is hereby created, which can also reach high tightnesses accordingly, for example of protection class IP65 and above.

The cable lead-through can be configured in principle with its separable frame so that it is embodied for example with two or three longitudinal strips, which are connected to one another accordingly via four or six side strips. The longitudinal strips and side strips can thus be provided in the form of individual components so that the frame is actually only constructed on-site at the time of assembly. In accordance with an extremely favourable embodiment, the cable lead-through is designed however such that a side strip is provided on each of the longitudinal strips, so that the longitudinal strip and the side strip form an L or alternatively one side strip is provided at each of the two ends of at least one of the longitudinal strips, so that the longitudinal strip and side strips form a U. The first structure is the variant in which a side strip and the longitudinal strip form an L. Here, two similar component parts can be connected to one another, for example by screwing or clipping. The alternative provides that for example two U-shaped parts are connected to one another, which likewise enables the use of identical parts. It is also possible to provide a U-shaped frame, which is then closed by one of the longitudinal strips as a cover. In the different variants, for example the two U-shaped variants of the frame upper part and the frame lower part or the U-shaped frame upper part with straight cover, further intermediate elements with longitudinal strip and side strips can be inserted, which then could be embodied in an H-shaped or U-shaped manner accordingly, or, in the case of the L-shaped embodiment of the individual parts of the frame, could be embodied in the manner of a horizontal Z with right-angled transitions between the side strips and the longitudinal strip.

A further very advantageous embodiment of the concept provides that the spacer elements are of different heights. The spacer elements can thus be used and stored in different heights. This makes it possible, for example, to use, adjacently, two small grommets with a grid pitch of 1:1 and thereabove a larger grommet, for example with a grid pitch of 2:2 or 2:1. In addition, this region can be closed off by means of a correspondingly taller spacer element, which heightwise has a grid pitch of two or three, and in addition further grommets can then be positioned next to it. In the above-described advantageous embodiment with the loosely inserted intermediate base, this region with the spacer element of shorter height can be closed off upwardly, or, in the case of a reversed installation, can also be closed off downwardly, preferably by means of an intermediate base of this kind. In order to also enable again the use of one of the spacer elements of shorter height on the intermediate base, it can be provided that the intermediate base in accordance with an advantageous development of the concept has a plurality of recesses or holes on at least one side, similarly to those in the longitudinal strips.

The different height of spacer elements thus makes it possible to increase flexibility. Due to the tight fit of the individual grommets in one of the longitudinal strips, this is normally sufficient, with an appropriate depth of the end face of the grommet and of the longitudinal strip, in each case considered in the direction of travel of the inserted cables, to ensure a sufficient stability, even if an upper end face of a shorter spacer element merely abuts in the region of a further grommet or a flat intermediate base and is not introduced into a recess or the holes of the upper longitudinal strip. An intermediate base provided with recesses or holes naturally provides further advantages here.

It is provided here in accordance with a very advantageous development that the spacer elements with a height corresponding to the internal height of the frame have pins or insertion strips on both end faces, and that the spacer elements of a shorter height have pins or insertion strips only on one of the end faces. The shorter spacer elements are hereby flat on their side not connected to the longitudinal strip by insertion and thus ensure a sufficient seal in the event of contact with the underside or upper side of one of the grommets or a flat intermediate base.

In accordance with a very advantageous development of the concept it is also provided here that the spacer elements in the direction of travel of the inserted cables are waisted with at least one indentation. These are thus waisted accordingly for example in that a double-T-shaped profile of the spacer elements is provided. Further variants, such as a double-cross-shaped profile or the like are also conceivable. This results in a form-fitting connection in the case of the grommets formed typically with a comparable profile in addition to the pressing of the material of the resilient grommets against the spacer elements, such that a reliable strain relief of the grommets is ensured, alongside a high tightness of the structure.

In accordance with an advantageous development of the concept it can be provided here that the spacer elements are provided in at least one of the indentations of their waisting with a resilient sealing material. The spacer elements themselves may thus also comprise a sealing material. This can be advantageous for example if the grommets are not formed from resilient material, but from correspondingly harder materials. In particular, it may also be advantageous if a certain number of grommets are inserted in the frame in accordance with the grid pitch. If the frame for example is provided for a grid pitch of 5 widthwise and here provides the introduction of normally four spacer elements so that each grid cell can be occupied with a grommet with the grid pitch of 1:1, it may then be in practice that installation space remains if for example two grommets with the grid pitch of 2:2 and one grommet with the grid pitch of 1:1 are used along the width of the frame, since the installation space is provided across the overall width for the use of four individual spacer elements, whereas only two spacer elements have now been used. In this case the overall width can be filled again completely very easily and efficiently by two× two spacer elements arranged directly adjacently, without specific grommets or specific spacer elements having to be provided. For this case it is particularly advantageous if the spacer elements are provided with sealing material in an indentation of their waisting. This resilient sealing material can be provided directly on the spacer elements, for example applied by injection moulding during the production process. However, it can also be applied very easily and efficiently during the assembly by a sealing tape glued into the indentation of the waisting on-site by the installer. The adjacently arranged spacer elements then also ensure a sufficient seal in the region in which they contact one another directly, said seal being comparable to that in the regions where the spacer elements are in contact with the resilient grommets. This further increases the flexibility of the structure and ensures a high seal of the overall structure in any assembly situation.

The spacer elements in accordance with an alternative advantageous embodiment can also be convexly bulged. They then offer the possibility to also establish form-fitting contact with the individual grommets. Bulged spacer elements arranged in the direction of travel of the inserted cables centrally on the respective longitudinal strip also make it possible for the material of the grommets to largely surround the spacer elements with a minimal gap therebetween or bearing thereagainst with contact, which ensures a very high seal of the structure, since the seal can then be provided primarily by the resilient material of the grommets.

A further very advantageous embodiment of the spacer elements may also provide that each of the spacer elements is formed in the direction of travel of the inserted cables from at least two individual elements. Instead of the above-described double-T-shaped profile, only two individual elements, for example rectangular beams or round bars, can thus also be used as spacer elements. The advantage compared to a single spacer element which for example could also be formed as a round bar in accordance with the last-described variant, lies in the fact that the forces applied for the strain relief and the seal are/is divided over two separate regions, such that the forces are introduced more uniformly into the longitudinal strips and therefore the cable lead-through per se.

It is conceivable in principle for the spacer elements to be inserted at an incline, for example in order to receive grommets that are shaped in an inclined manner for specific applications. However, this will play a subordinate role in practice. Rather, it is of decisive advantage here if the spacer elements run parallel to the side strips, which in turn are positioned perpendicular on the longitudinal strips. All in all, a structure with component parts arranged perpendicularly to one another in the assembled state is thus attained, which is correspondingly simple in respect of its assembly and with the use of prefabricated spacer elements and grommets.

The sides can be either screwed or clipped here to one another or to one of the longitudinal strips as cover, as is already known from the prior art described at the outset.

It is also conceivable for example in the case of very wide frames to provide at least one stationary spacer element, for example in the form of a central partition wall, in addition to the insertable spacer elements. This stationary spacer element can then carry a screwed connection for example, such that a high stability and a high tightness are possible by a strong and very uniform pressing of the grommets.

Further advantageous embodiments and developments of the cable lead-through according to the invention will also become clear from the rest of the dependent claims and will be clarified on the basis of the exemplary embodiment described hereinafter with reference to the drawings.

Specifically, the drawings show:

FIG. 1 a cable lead-through according to the prior art in a three-dimensional view.

FIG. 2 a cable lead-through according to the prior art in an alternative embodiment in the closed state.

Figure 1:
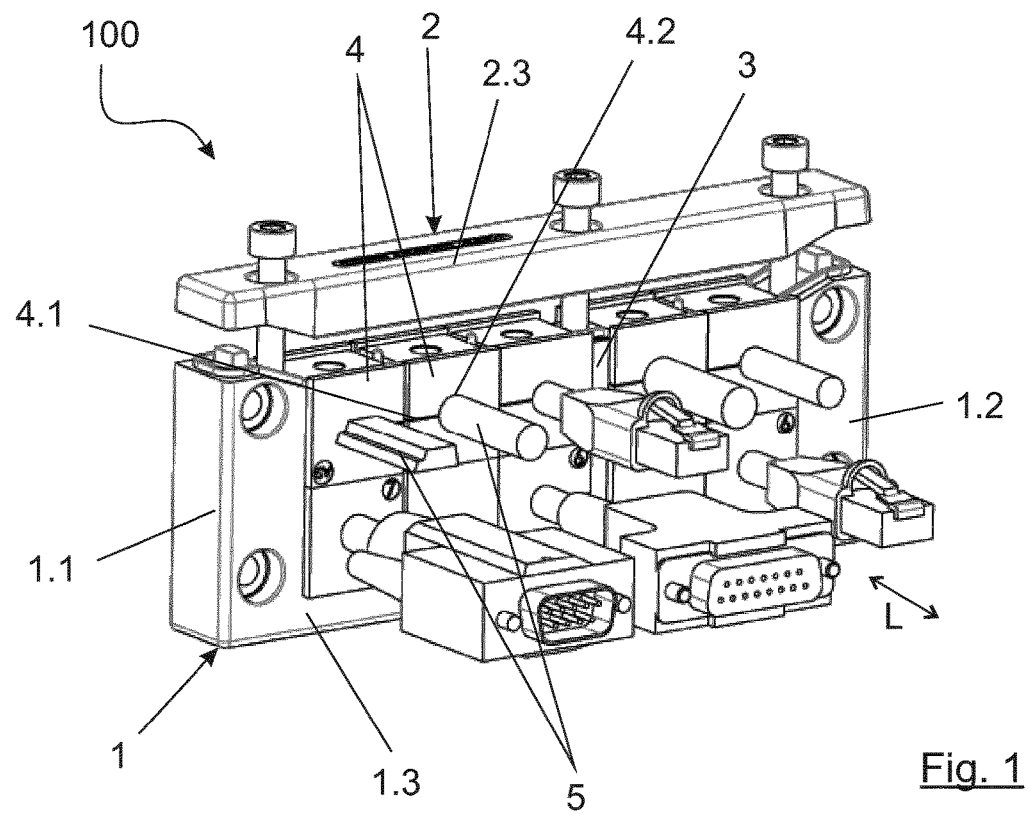

In the depiction of FIG. 1 a three-dimensional view of a cable lead-through 100 according to the prior art can be seen. In the exemplary embodiment shown here, it has a separated frame with a frame lower part 1 and a cover 2. The frame lower part 1 consists of a longitudinal strip 1.3 and two side strips 1.1 and 1.2. The cover 2 of the frame in practice forms a second longitudinal strip 2.3. A partition wall 30 can be seen between the side strips 1.1 and 1.2 in the U-shaped frame lower part 1 and in this exemplary embodiment of the prior art is formed integrally with the frame lower part 1 and is accordingly fixedly connected to the longitudinal strip 1.3. Intermediate spaces, which in the exemplary embodiment shown here are each provided with a grommet 4, more specifically giving a total of ten individual grommets 4, are provided between the partition wall 30 and the respective side strips 1.1 and 1.2. Partition walls 30 of smaller dimensions and running here parallel to the partition wall 30 are also arranged between the pairs of grommets 4 each stacked one on top of the other. These partition walls, however, are not clearly visible in the depiction of FIG. 1.

Each grommet 4 has a through-hole 4.2, in which the cables 5 running through the cable lead-through 100 are received accordingly. Here, only some of the grommets 4 and cables 5 have been provided with reference signs.

Figure 2:
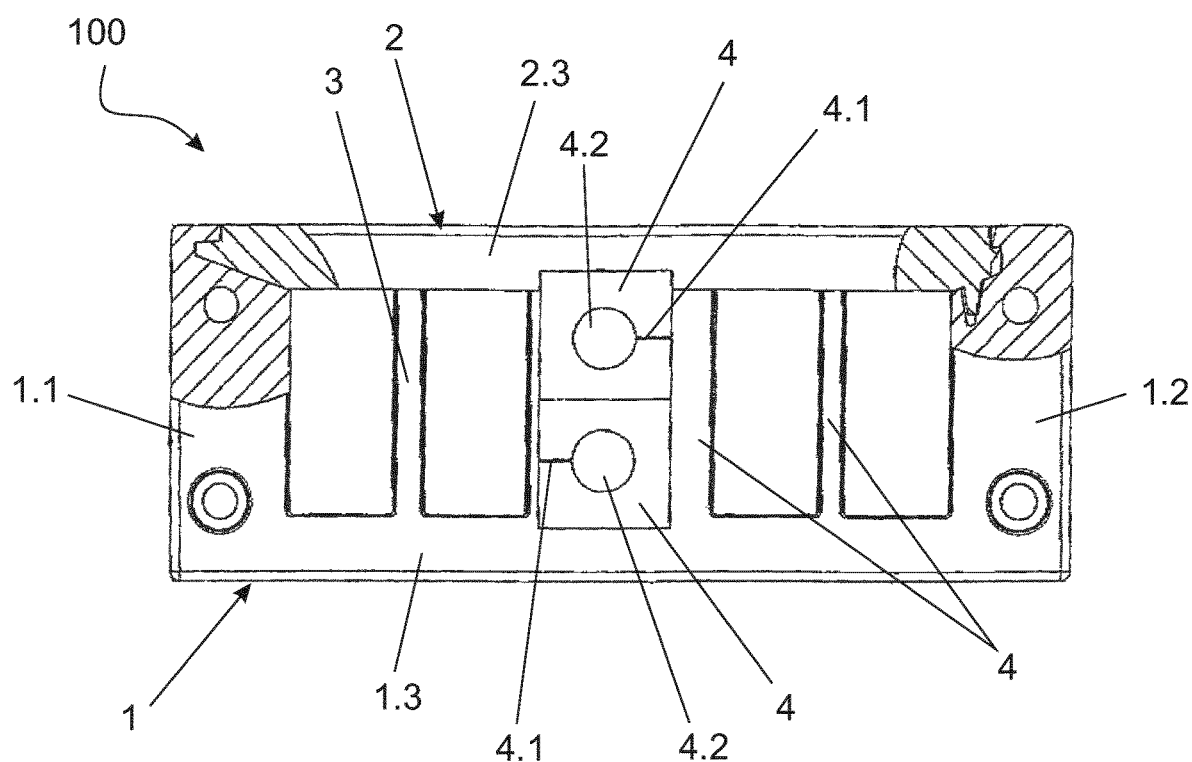

In the depiction of FIG. 2 a further structure known from the prior art can be seen. In contrast to the structure in FIG. 1, merely two of the grommets 4 have been shown by way of example in the depiction of FIG. 2. Here, each of the partition walls 30 is therefore visible. It can also be seen that the grommets 4 each have a through-hole 4.2 for receiving the cable. In addition, a slit denoted by 4.1 can be seen between the through-hole 4 and the outer circumference of the corresponding grommet 4. The grommet 4 can thus be folded open so that cables 5 with plugs can also be inserted easily and efficiently in the through-hole 4.2 of the grommet 4. The cover 2, as one of the longitudinal strips 2.3 of the frame, in the variant of FIG. 2 is not screwed in position as in the depiction in FIG. 1, but instead is clipped in position. This structure is also known to this extent from the prior art. The direction of travel L of the cables running through the cable lead-through 100 runs here perpendicularly into the drawing plane in the depiction of FIG. 2.

Figure 3:
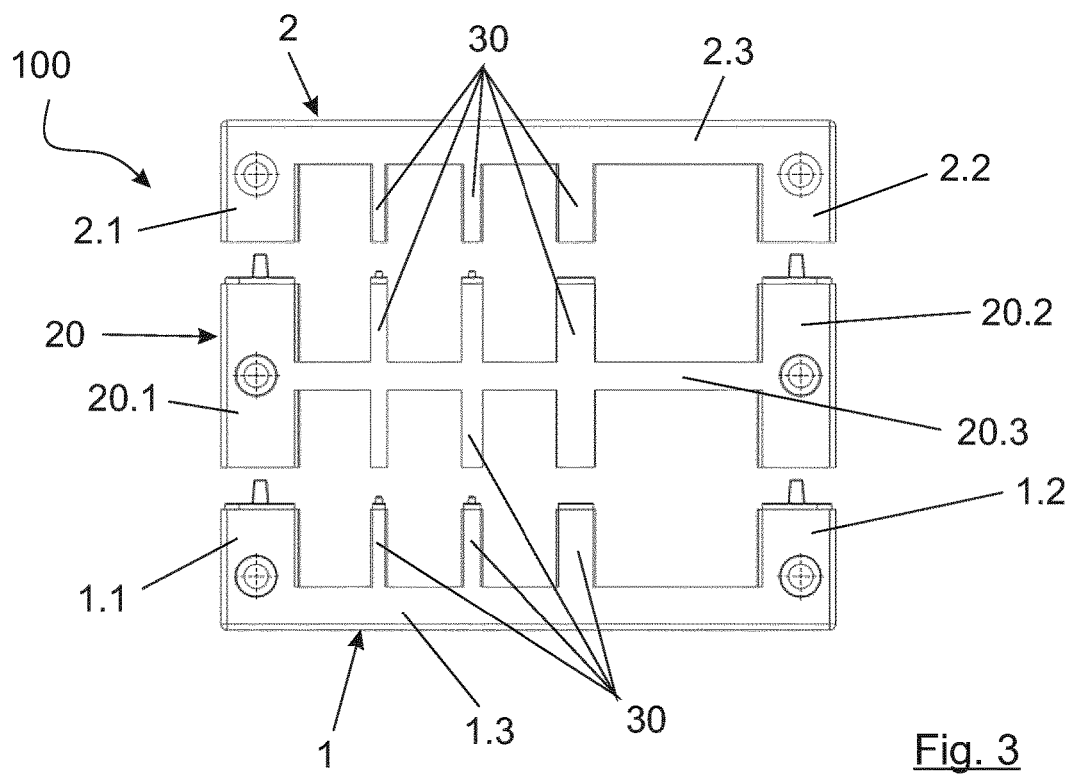
FIG. 3 shows a cable lead-through according to the prior art in a further alternative embodiment.

In the depiction of FIG. 3 a further variant from the prior art can be seen and can be explained substantially similarly to that in FIG. 1. In contrast to the depiction there, no cables 5 or grommets 4 have been shown here. Rather, a frame lower part 1, in which the side strips 1.1 and 1.2 together with the longitudinal strip 1.3 form substantially a U without consideration of the partition walls 30, is shown. The cover 2 is embodied here similarly, and with its side strips 2.1 and 2.2 substantially likewise forms a reversed U. In addition, in the case of this structure, in contrast to the structure in FIG. 1, a frame intermediate part 20 can be seen, which, if the partition walls 30 are not taken into consideration, is composed in the form of a substantially H-shaped component formed in turn from two side strips 20.1, 20.2 and one longitudinal strip 20.3, which also could be referred to as an intermediate base 11. This structure is also known to this extent from the prior art described at the outset.

Figure 4:
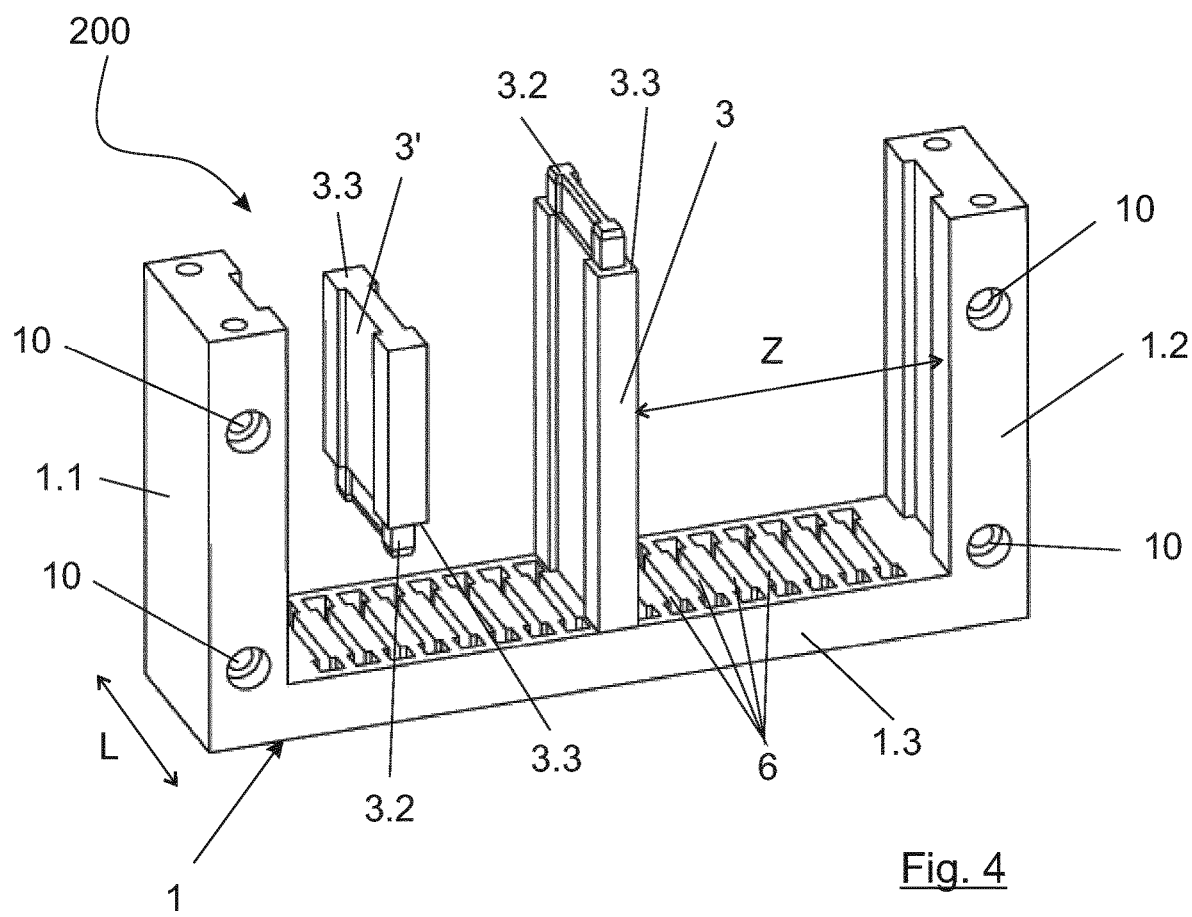
FIG. 4 shows, in a perspective depiction, an embodiment of a cable holder according to the invention.

In the depiction of FIG. 4, the frame lower part 1 of a cable lead-through 200 according to the invention is shown. The frame lower part 1 is U-shaped here and again has, preferably in a one-part design, the longitudinal strip 1.3 at the bottom and the side strips 1.1 and 1.2 positioned thereon perpendicularly at the sides. A cover 2 (not shown here) as second longitudinal strip 2.3 can be formed for example comparatively to the longitudinal strip 1.3, but without the side strips 1.1 and 1.2. This cover 2, in the exemplary embodiment of FIG. 4 shown here, is screwed to the frame lower part 1.

Two spacer elements 3, 3' can be seen in the frame lower part 1. One spacer element 3 has a greater height than the other of the spacer elements 3'. The spacer element 3 of greater height has insertion strips 3.2 at both end faces 3.3, which insertion strips are double-T-shaped in cross-section and are chamfered on their side remote from the end face 3.3. Correspondingly to these insertion strip 3.2, the longitudinal strip 1.3 of the frame lower part 1 and, without this being shown here, also the longitudinal strip 2.3 as cover 2, has recesses 6. A plurality of these recesses 6, as can be seen in the depiction of FIG. 4, are arranged adjacently, so that the width of an intermediate space Z for example between the taller of the spacer elements 3 and the side strip 1.2 can be varied accordingly by inserting the spacer elements 3 into a different one of the recesses 6.

The shorter spacer element 3' shown on the left in the depiction of FIG. 4 and not yet inserted into the recesses 6 likewise has the insertion strip 3.2 on its end face 3.3 pointing downwardly. It is flat at its other end face 3.3, which in the depiction of FIG. 4 faces upwardly. This is advantageous in the case of the spacer elements 3' that are shorter than the overall height of the interior of the frame for reasons that will be explained later in greater detail.

Figure 5:
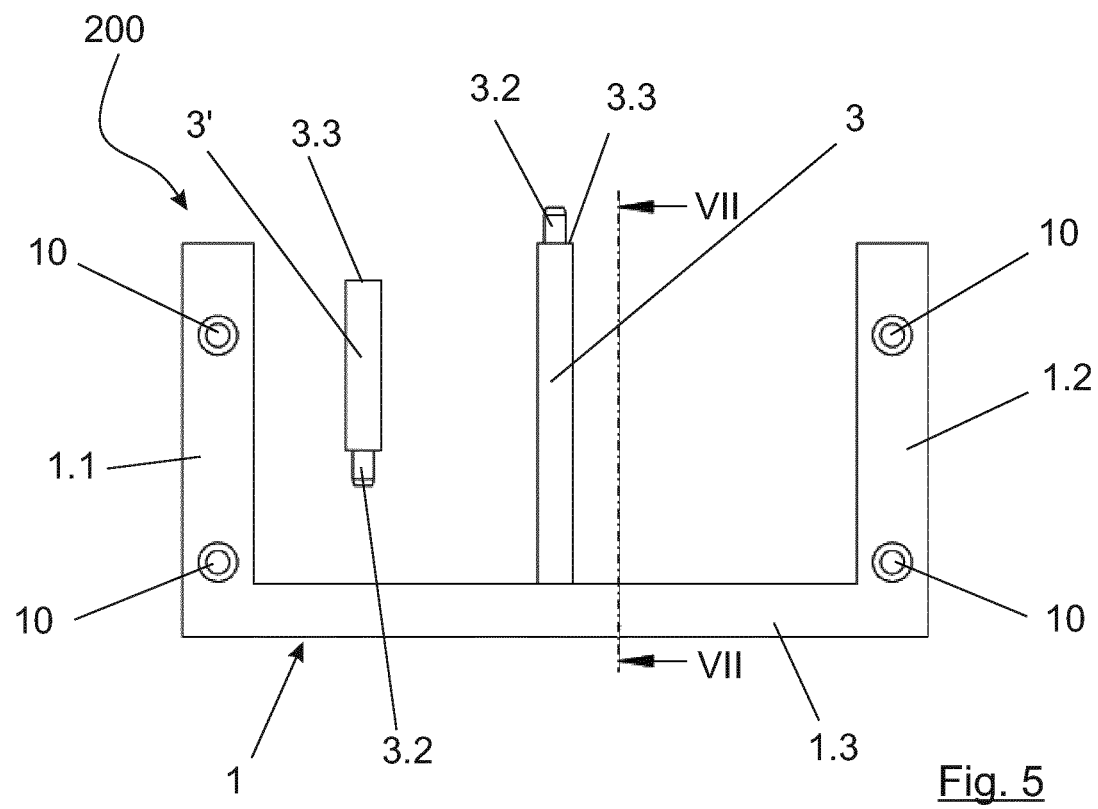
FIG. 5 shows the subject matter of FIG. 2 in a side view.
Figure 6:
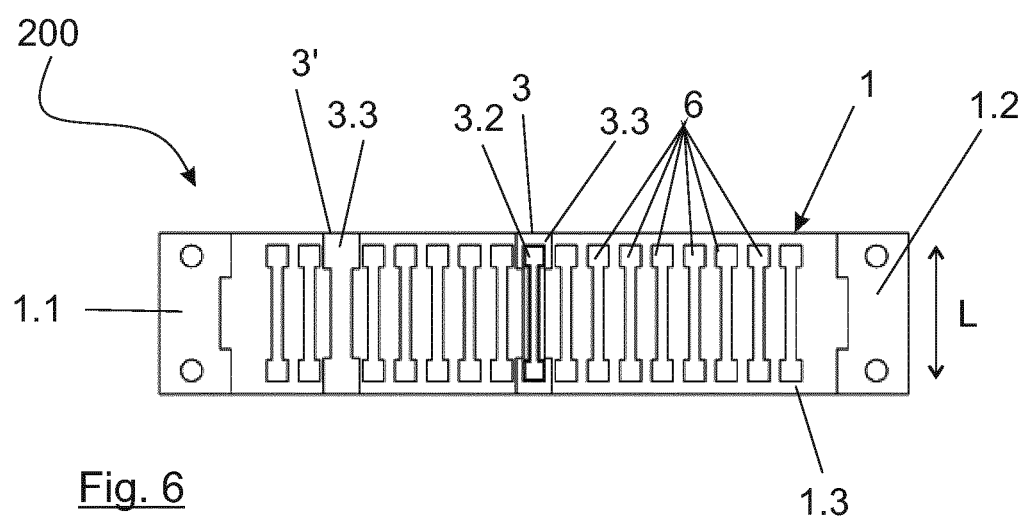
FIG. 6 shows the subject matter of FIG. 2 in a plan view.
Figure 7:
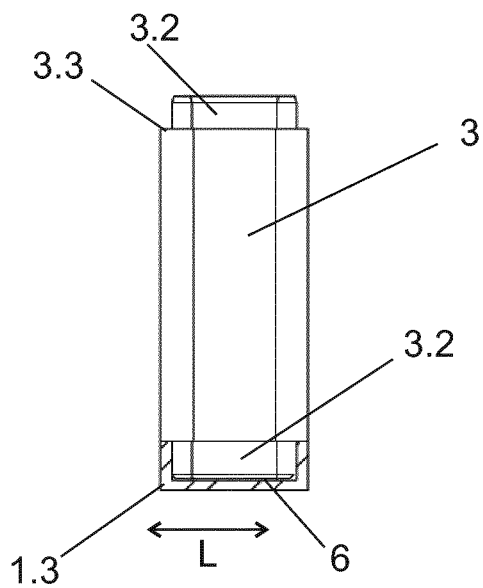
FIG. 7 shows a sectional view according to the line of section VII-VII in FIG. 5.

In the depiction of FIG. 5 the structure is shown in a side view, again, similarly to the depiction in FIG. 4, with a shorter spacer element 3' not yet fully inserted. In the depiction of FIG. 6 the same structure can be seen again in a view from above. Here as well the individual recesses 6 in the region of the longitudinal strip 1.3 and the side strips 1.1 and 1.2 can be seen. The spacer elements 3, 3' are each inserted here and have the same depth as the two side strips 1.1 and 1.2 in the direction of travel L of the cables 5 guided through subsequently. FIG. 7 shows a basic sectional view through the longitudinal strip 1.3 with fitted spacer elements 3 along the line VII-VII in FIG. 5. It can be seen here that the groove which ultimately forms the recess 6 is designed such that material of the longitudinal strip 1.3 remains around the recess 6 both in the direction of travel L of the cables 5 guided through subsequently and in the height direction in the depiction of FIG. 6. A seal is hereby possible easily, and the grommets 4 used for strain relief of the cables 5 in the direction of travel L of the cables and which ideally are connected form-fittingly to the waisted profile of the spacer elements 3, 3' transmit the forces of the strain relief via the spacer elements 3, 3' to the material of the longitudinal strip 1.3 and thus ensure a reliable strain relief. This would not be possible in the case of open-edged recesses 6, for example continuous grooves.

As already mentioned, the insertion strips 3.2 are provided here with a substantially double-T-shaped profile. They are designed so that they sit tightly with their insertion strips 3.2 in the recesses 6 of the longitudinal strip 1.3, so that the spacer elements 3, 3' cannot fall out during the assembly as the grommets 4 with the cables 5 are inserted. As a result of the chamfer on the side of the insertion strips 3.2 facing away from the end face 3.3, an easy and reliable insertion is possible here. The surfaces can be processed accordingly, for example roughened or provided with transverse grooves and/or with sealing elements, in order to support this tight fit. Here, a tight fit is to be understood in the manner of a press fit, which is designed however such that the components can be fitted together by hand. Here, a looser fit is preferred at the other of the longitudinal strips 2.3, that is to say here the cover 2 (not shown), for example in the manner of a clearance fit, so that the insertion strips 3.2 are received reliably in the recesses 6, but in the case of disassembly remain in the other of the insertion strips 1.3 with a tight fit, and the cover 2 can be removed without the spacer elements 3, 3' remaining fitted thereon. This enables a particularly easy disassembly, for example for the replacement of individual grommets 4 and/or cables 5. The subsequent reassembly can then be performed easily and efficiently.

Figure 8:
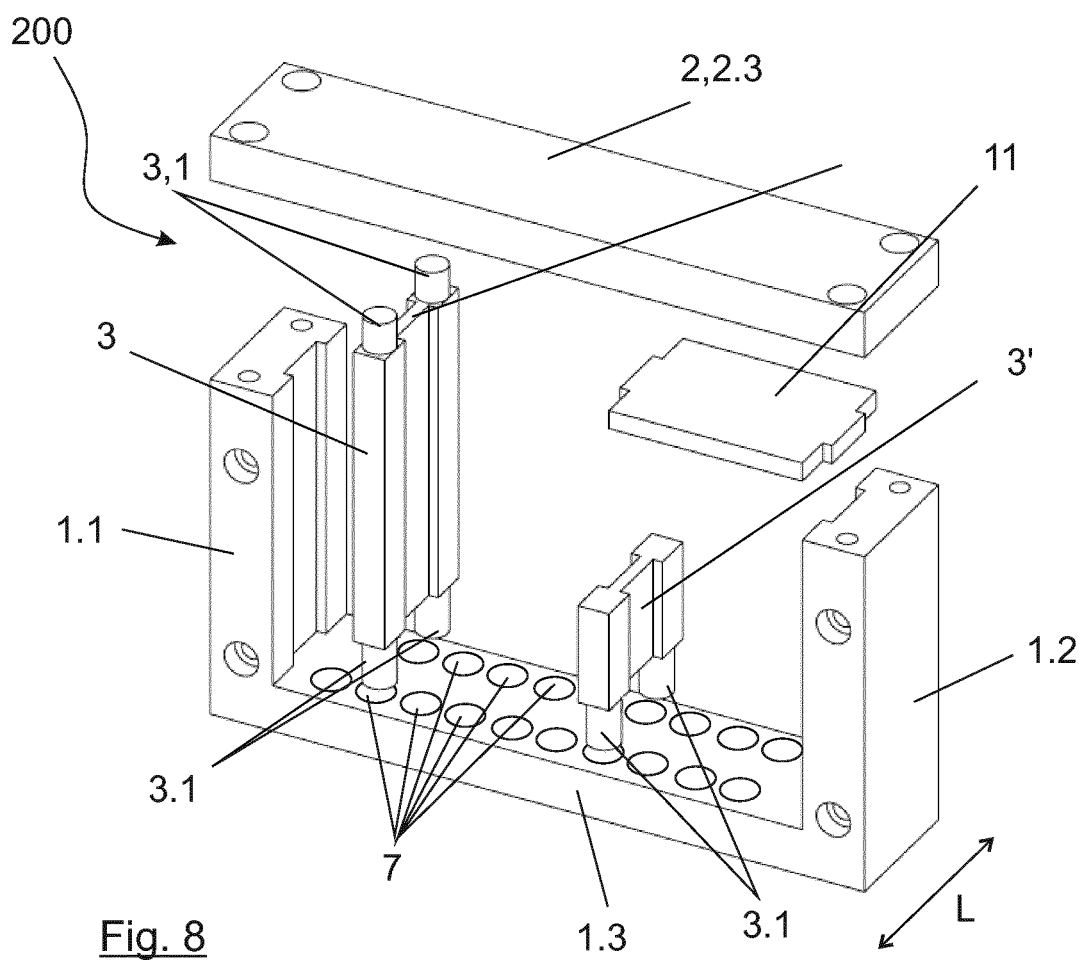
FIG. 8 shows an alternative embodiment in a perspective depiction.

An alternative embodiment, but substantially similar to the depiction in FIG. 4, is shown in the depiction of FIG. 8. The cable lead-through 200 is shown again in a three-dimensional view, here also together with the cover 2 used as second longitudinal strip 2.3. The first difference lies in the fact that holes 7 are provided here instead of the recesses 6 and cooperate accordingly with corresponding pins 3.1 on the spacer elements 3, 3'.

An intermediate base denoted by 11 can also be seen in the depiction of FIG. 8 and cooperates form-fittingly in the direction of travel L of the cables 5 with the waisted design of the side 1.2 and one of the spacer elements 3, 3'. This will be explained and shown again in greater detail in FIG. 14 in the details of an assembly. The intermediate base 11 can be embodied here as shown with smooth surfaces, so that it cooperates, as already mentioned, with the spacer element 3' of shorter height, more specifically the smooth end face 3.1 thereof. It is just as equally conceivable to provide the intermediate base 11, similarly to the longitudinal strips 1.3, 2.3, with recesses 6 or holes 7, so that the spacer elements 3, 3' could also be inserted into the intermediate base 11.

Figure 9:
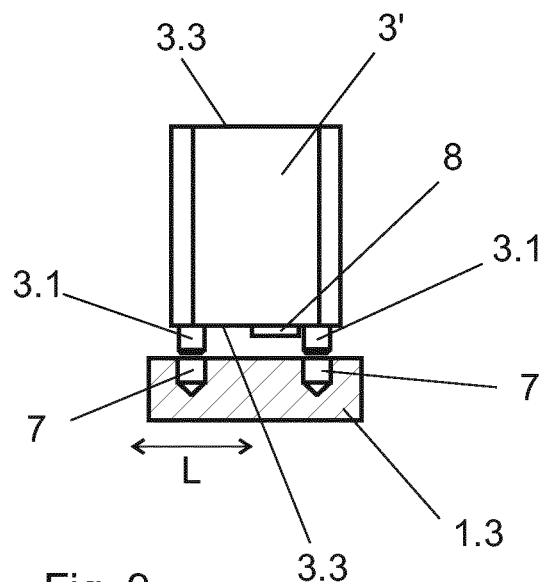
FIG. 9 shows the structure similarly to the sectional view in FIG. 7 on the basis of the alternative embodiment of FIG. 8.

A basic sectional depiction substantially similar to that in FIG. 7, but for the variant of the cable lead-through 200 according to FIG. 8, is again shown in FIG. 9. The holes 7 are formed here preferably as blind-bore holes, and therefore the material of the longitudinal strip 1.3 lies around the entire hole 7 and therefore creates a sealed structure with a high load-bearing capacity in respect of the strain relief in particular in the direction of travel L of the inserted cables 5. In order to ensure a reliable seal between the longitudinal strip 1.3 and the spacer element 3' (which here is shorter for example), a seal can be provided optionally in the region of one end face 3.3, or, in the case of a long spacer element 3, also in the region of both end faces 3.3. A seal of this kind is shown primarily in the depiction of FIG. 9 and is provided with the reference sign 8.

Figure 10:
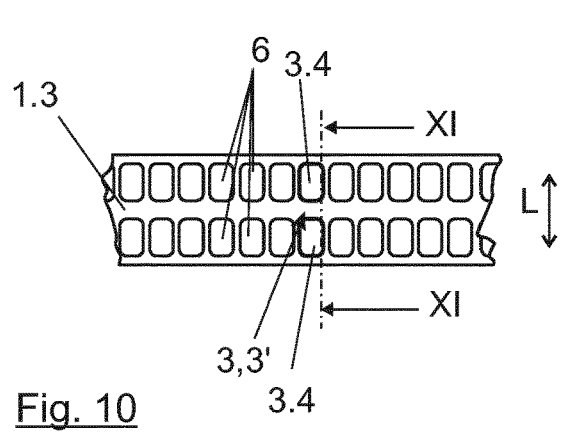
FIG. 10 shows a detail of one of the longitudinal strips of an alternative variant with two-part spacer elements fitted thereon.
Figure 11:
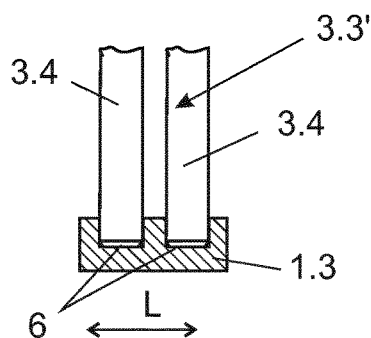
FIG. 11 shows a basic sectional depiction along line XI-XI in FIG. 10.

In the depiction of FIG. 10 a further variant in a detail similar to that in FIG. 6 can be seen. Instead of the continuous recesses 6 in the form of a double-T-shaped groove, for example as in the depiction of FIG. 6, and the holes 7 from the depictions of FIGS. 8 and 9, two recesses are provided here, which for example have the shape of rectangles with rounded edges. Two individual elements 3.4 in the form of beams embodied separately from one another are inserted into these recesses 6 and together form the spacer element 3, 3'. The spacer element 3, 3' can thus consist of two—or also more—parts in the direction of travel L of the inserted cables 5. The individual elements 3.4 of the spacer elements 3, which are shown again in the depiction of FIG. 11 in a section along the line XI-XI in FIG. 10, here have neither insertion strips 3.2 nor pins 3.1. The bars 3.4 rather are configured such that they fit directly into the recesses 6 and therefore can be inserted directly by their end-face end into the recesses 6, which correspond to the shape of the individual elements, at least in the region of their end-face ends. This can be transferred accordingly also to one-part spacer elements 3 and 3', as have been shown in the previous figures. This makes in particular the structure of the spacer elements 3, 3' very simple, since these no longer have to have any pins 3.1 or insertion strips 3.2. For example, in the embodiment in FIGS. 10 and 11, the use of single substantially rectangular beams as individual elements 3.4 is thus sufficient. Since the possibility of a stop is absent due to the absence of the end faces 3.3 provided with insertion strip 3.2 or pins 3.1, the recesses 6 all have to be manufactured with the same depth, so that they can form the stop at the end faces of the individual elements 3.4 of the spacer element 3, 3' now resting there.

Figure 12:
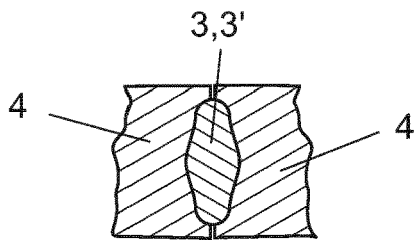
FIG. 12 shows a basic sectional depiction along the line XII-XII in FIG. 15 with a further alternative embodiment of the spacer element.
Figure 13:
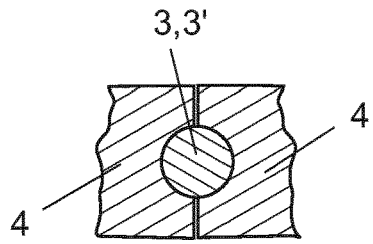
FIG. 13 shows a basic sectional depiction along the line XII-XII in FIG. 15 with yet a further alternative embodiment of the spacer element.

Further alternatives of spacer elements 3, 3' which come to lie in this way in each case between two of the grommets 4 and cooperate therewith form-fittingly and frictionally on account of the resilient material of the grommets 4 are shown in FIGS. 12 and 13. The grommets 4 here surround largely the entire contour of the spacer elements 3, 3', such that these disappear so to speak within the corresponding grommet 4. This is of decisive advantage in particular in respect of different grid pitches of the individual grommets 4 when populating a frame with grommets 4 of different sizes, since in a structure of this kind the width of the frame is dependent only on the grid pitches of the grommets 4 and is not also dependent on the width or number of the spacer elements 3, 3'. The structure of the spacer element 3, 3' in the depiction of FIG. 12 is substantially convexly bulged here, that is to say uses the same principles as the waisted design, but with a reversal of the shape between the grommet 4 and the spacer element 3, 3'. The same is true comparably for the spacer element 3, 3' of very simple design in FIG. 13, which is formed merely as a round bar and in particular can be placed in a hole 7 in the longitudinal strip 1.3 arranged centrally in the direction of travel L of the led-through cable.

Figure 14:
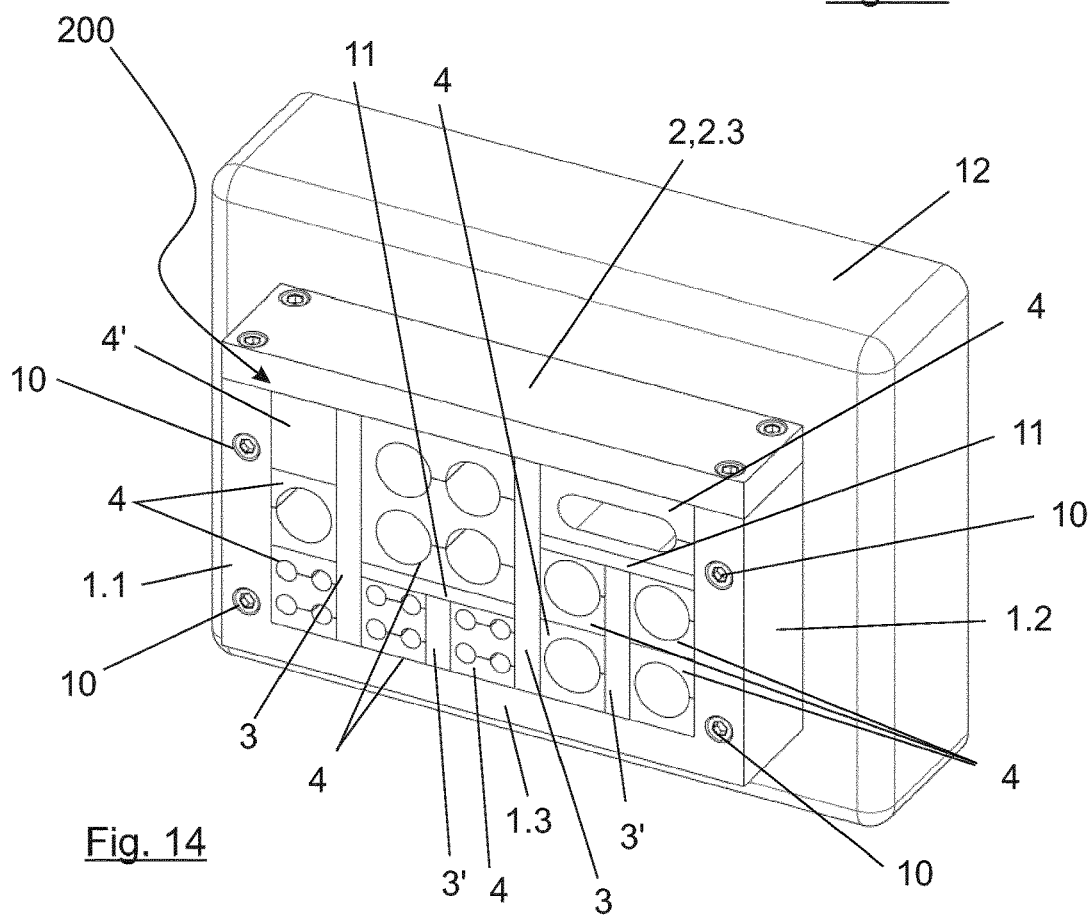
FIG. 14 shows a first possible assembly of the cable lead-through in a perspective depiction.

A first exemplary embodiment with an exemplary population of the cable feed-through 200 with a plurality of different grommets 4 is shown in the depiction of FIG. 14. The variant of the assembly shown here, wherein the cables 5 have not been shown for reasons of clarity, again shows a U-shaped frame lower part 1 with a longitudinal strip 2.3 as cover 2. The cable lead-through 200 as a whole is screwed to the wall 12 of an indicated switch cabinet by two lateral assembly holes 10 on each side and screws arranged therein and thus seals off an opening (not shown here) in the wall 12 of the switch cabinet, through which the cables 5 (not shown here) are to be led, inserted in turn in the grommets 4. The assembled structure in the depiction of FIG. 14 here shows a plurality of different kinds of grommets also including what is known as a blind grommet 4', which does not have a through-hole. Two spacer elements 3 having the internal height of the frame of the cable lead-through 200 are inserted between the frame lower part 1 and the cover 2, as well as two spacer elements 3' of different, reduced height. An intermediate base 11 is disposed above each of the shorter spacer elements 3', before the next grommet 4 follows, in order to distribute the compressive forces as uniformly as possible and act on all grommets 4 with forces that are as homogeneous as possible. A very good seal of the structure of the cable lead-through 200 can be achieved hereby.

Figure 15:
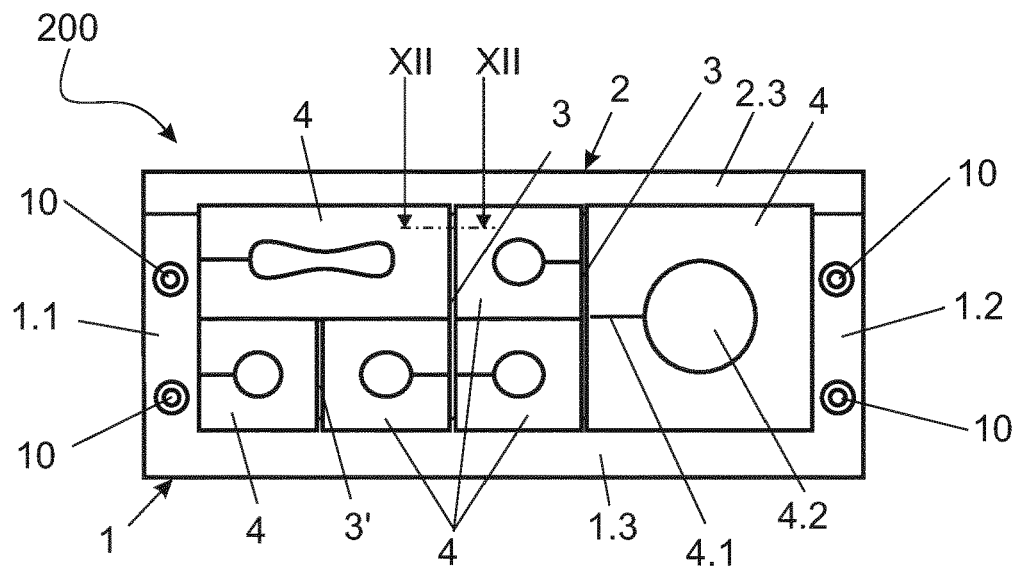
FIG. 15 shows an alternative variant similar to that in FIG. 14, but in a front view.

In the depiction of FIG. 15 a comparable structure is shown again purely in plan view, here without the wall 12 of the switch cabinet. The structure should use fundamentally the spacer elements 3, 3' as shown in FIGS. 12 and 13. Here, the individual grommets 4 are arranged so closely to one another that the spacer elements 3, 3' therebetween can hardly be seen, wherein in order to provide a clearer view the gap between individual grommets 4 has been shown in the depiction of FIG. 15 even larger than it is in reality. These spacer elements 3, 3' received within the width of the grommets 4 enable the use of a different number of spacer elements 3, 3' within the cable lead-through 200, without the externally measured grid pitches of the individual grommets 4 having to be adapted. The cover 2 and the frame lower part 1 can be screwed or clipped here, for example.

Figure 16:
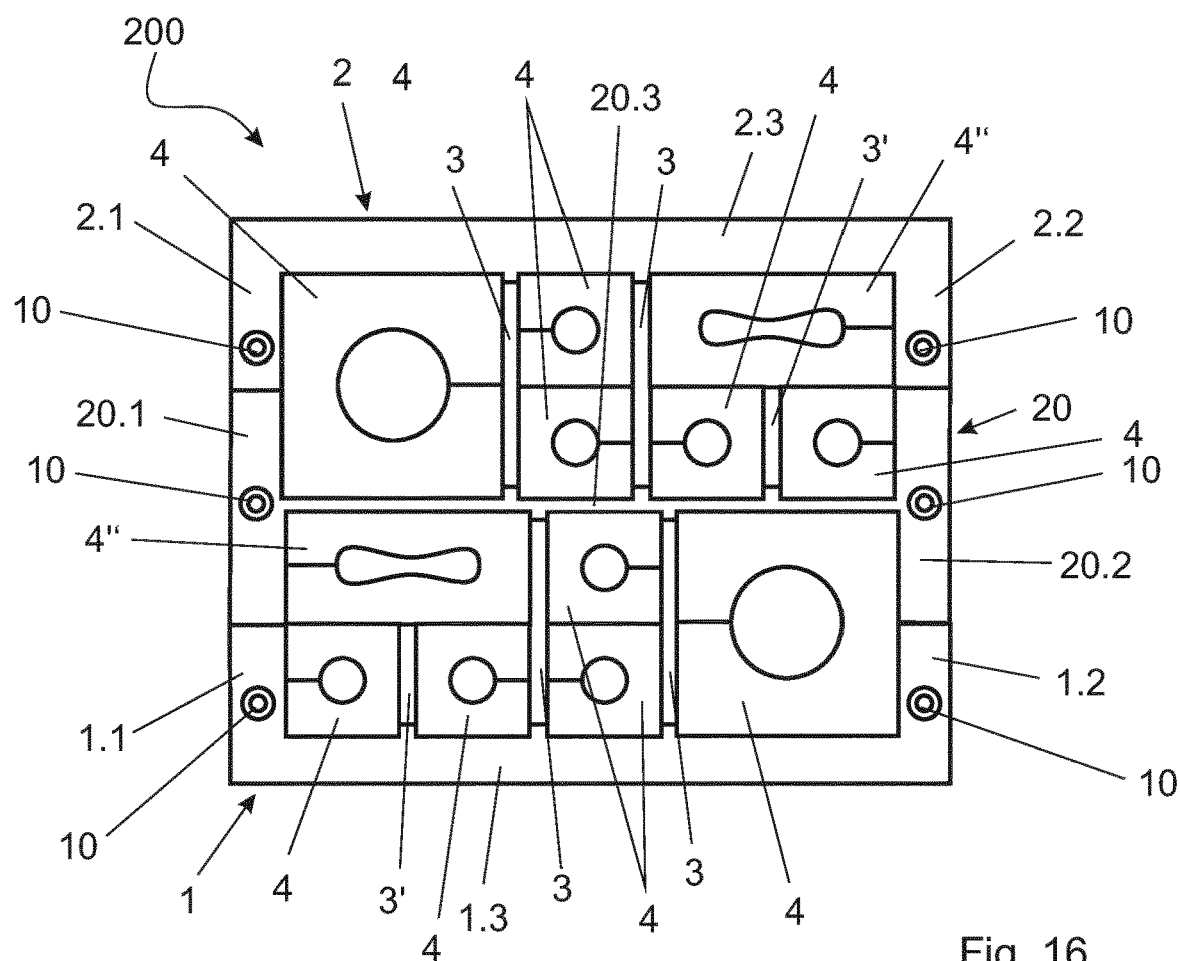
FIG. 16 shows a further variant similar to that in FIG. 15 with a different structure of the frame.

In FIG. 16 a structure can be seen in which the frame lower part 1 forms a U with its two sides 1.1 and 1.2 and the longitudinal strip 1.3. This applies similarly to the cover 2 with its side strips 2.1 and 2.2 and its longitudinal strip 2.3. Similarly to the depiction according to FIG. 3 from the prior art, an intermediate part 20 is disposed therebetween with its sides 20.1 and 20.2 and a further longitudinal strip 20.3, which is formed in one part with the sides 20.1 and 20.2 and which has, accordingly, possibilities for insertion of the spacer elements 3, 3' both from above and from below, or here also in the form of continuous recesses 6 or holes 7.

In the assembly variant of FIG. 16, two spacer elements 3 each with a height over the entire height of the frame are shown at the bottom, as well as a shorter spacer element 3', here the spacer element 3' arranged furthest to the left in FIG. 16. From right to left, the assembly is such that firstly a grommet 4 with the grid pitch 2:2 is inserted, then a spacer element 3, then two grommets 4 one above the other with grid pitches 1:1, then again a spacer element 3. A grommet 4 with the grid pitch 1:1 then follows in the lower region, a shorter spacer element 3', and a further grommet 4 with the grid pitch 1:1. Above, in contact with the two grommets 4 and the end face 3.3 of the shorter spacer element 3', there is disposed a further grommet 4", which for example is designed to receive a flat cable, and which deviates here by way of exception from the grid pitch, since in its width it additionally comprises the width of one of the spacer elements 3. The cable lead-through 200 together with an optional additional sealing strip can then be screwed via lateral assembly holes 10 to the wall 12 (not shown here) around an opening for leading through the cables 5, for example in the switch cabinet. The same structure is provided again in the upper half of the cable lead-through 200 in FIG. 16, but mirrored. In contrast to FIG. 14, the intermediate bases 11 have been omitted here, or the further longitudinal strip 20.3 of the intermediate part 20 forms an intermediate base 11 of this kind. In the case of the shorter spacer elements 3, 3' at the top and bottom, there are no intermediate bases 11 here, however this is also conceivable in principle.

Figure 17:
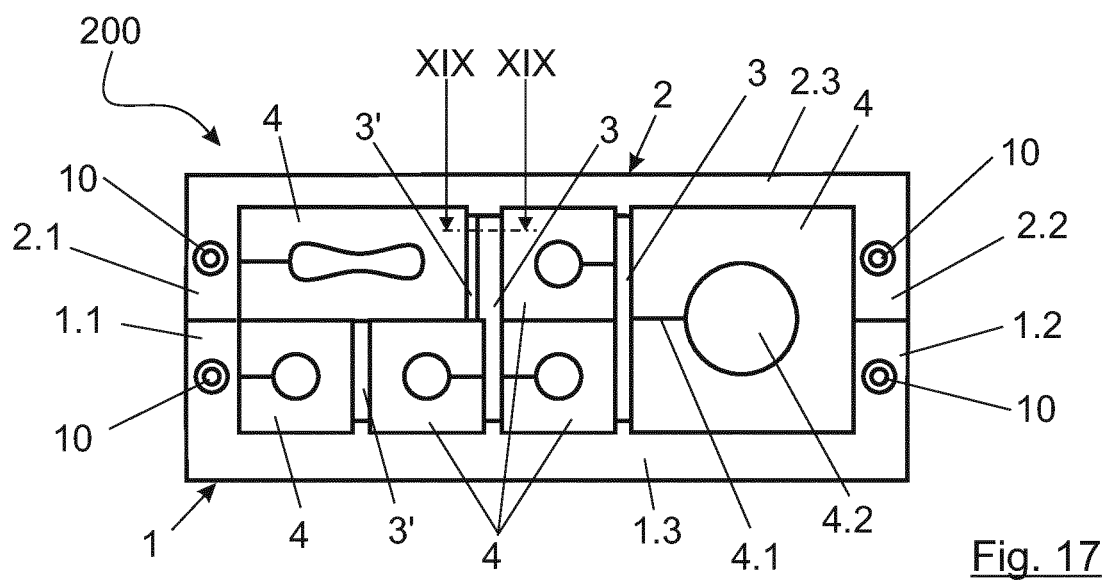
FIG. 17 shows a further alternative variant similar to that in FIG. 15.

Alternatively, a structure can be seen in the depiction of FIG. 17 in which the grommet 4 denoted by 4" in FIG. 16 also remains within the grid pitch and has a grid pitch of 2:1. The remaining space is compensated by a further shorter spacer element 3', which is inserted into the cover 2 as longitudinal strip 2.3 and which comes to lie directly adjacently to the middle one of the spacer elements 3. This additional use of a shorter spacer element 3 directly next to the taller spacer element 3' has the advantage here that no grommets 4 which deviate from the grid pitch are necessary, similarly to the alternative according to FIG. 15.

In the depiction of FIG. 17 a frame is additionally used which has a U-shaped design both in the case of the frame lower part 1 and in the case of the cover 2. In particular, the cover 2 and the frame lower part 1 can be formed as identical components, which for example are screwed or clipped to one another from top to bottom on one side and from bottom to top on the other side. Further costs in the production and in the toolmaking for the frame lower parts 1 and cover 2, which for example are injection moulded, can hereby be saved.

Figure 18:
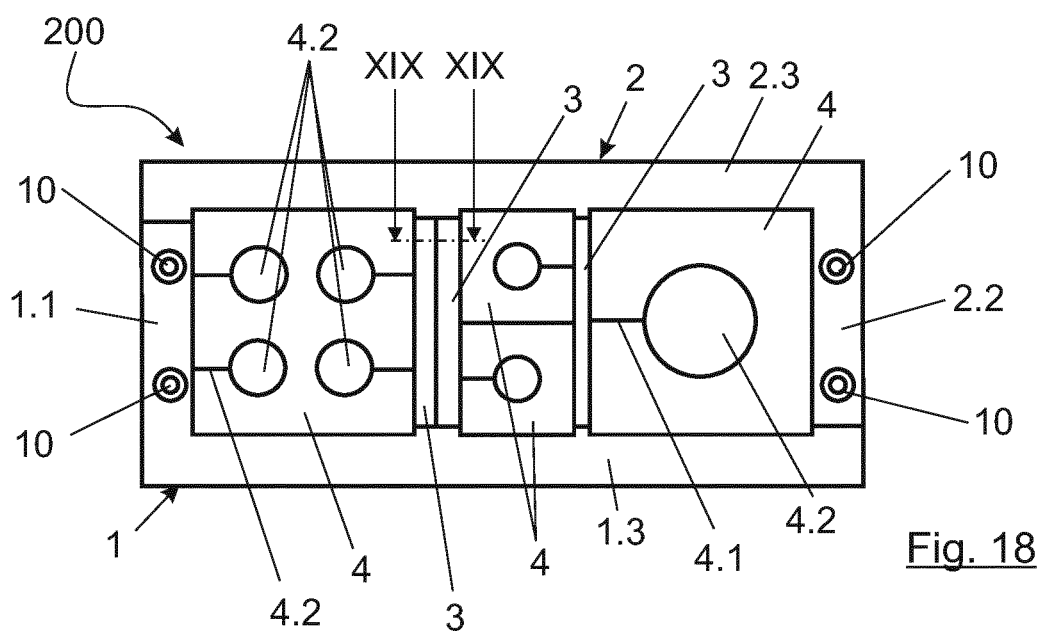
FIG. 18 shows yet a further alternative variant similar to that in FIGS. 15 and 17.

A further variant can be seen in the depiction of FIG. 18. This also differs again from the previous variants in respect of the frame lower part 1 and the cover 2 because both the frame lower part 1 and the cover 2 are substantially L-shaped here and therefore the frame lower part carries the longitudinal strip 1.3 and a side strip 1.1, and the frame upper part, that is to say the cover 2, likewise carries a longitudinal strip 2.3 and a side strip 2.1.

The structure is in turn initially populated from right to left similarly to the structure in FIG. 17. The two grommets 4 with the grid pitch 1:1 are then followed by two of the taller spacer elements 3 and a further large grommet 4 with the grid pitch 2:2, which in the exemplary embodiment shown here has four through-holes 4.2. Here as well, in order to compensate for the adaptation of the total width, it is expedient to provide two spacer elements 3 adjacently to one another so as not to have to provide any special grommets 4.

Figure 19:
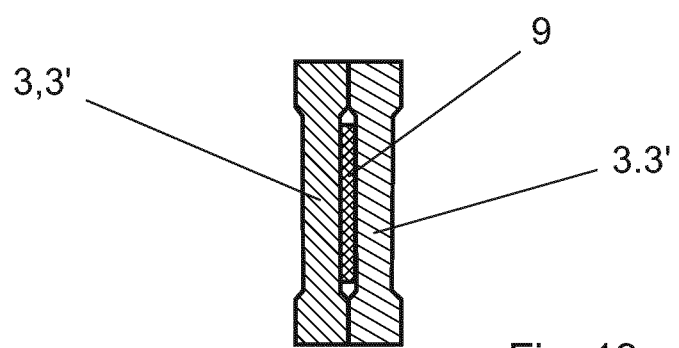
FIG. 19 shows a basic sectional view along the line XIX-XIX in FIGS. 17 and 18 without grommets.

In order to ensure a sufficient seal the cable lead-through 200 also in the case of adjacently arranged spacer elements 3, 3', as has been described for example in the structure in FIGS. 17 and 18, can now be provided for a sealing material 9 to be introduced between two adjacently arranged spacer elements 3, 3', in order to reliably seal the spacer elements 3, 3' produced from a harder plastic than the grommets 4, if these spacer elements are arranged adjacently to one another. This can be seen in FIG. 19. With a plain abutment of the plastic surfaces of the spacer elements 3, 3' against one another, a seal of this kind would not be possible, or would only be possible to a limited extent. Due to the resilient sealing material 9 between the spacer elements 3, which for example can be glued at the time of assembly in the form of a sealing strip, a very good seal is provided, and therefore on the whole a very tight structure of the cable lead-through 200 is made possible in spite of its high flexibility, which is a decisive advantage.

Of course, the different variants of frames, grommets 4 and spacer elements 3, 3' can be combined arbitrarily with one another, and in particular can also be used mixed with one another.

The invention claimed is:

1. A cable lead-through, comprising
a separable frame having at least two longitudinal strips and at least two side strips, which are positioned together in a plane perpendicular to the direction of travel (L) of the led-through cables,
spacer elements positioned between the longitudinal strips, at least one of which spacer elements forms an intermediate space (Z) between itself and a neighbouring spacer element or one of the side strips, which is designed for receiving at least one grommet, which in turn has at least one hole for leading through the cable; characterised by the following features:
each of the longitudinal strips has a plurality of holes or recesses on at least the side thereof facing the respective other longitudinal strip;
at least in the region of at least one of the end-face ends, each spacer element corresponds to the holes or the recesses in the longitudinal strips, such that the spacer elements can be introduced into the holes or recesses transverse to the direction of travel (L) of the led-through cables.

2. The cable lead-through according to claim 1, wherein each spacer element is provided on at least one of its end faces facing the longitudinal strips with pins or insertion strips, which in each case correspond to the holes or the recesses in the longitudinal strips.

3. The cable lead-through according to claim 1, wherein the holes or the recesses in the longitudinal strips are formed such that material of the longitudinal strip remains between the holes or the recesses and both outer edges of the longitudinal strip in the direction of travel (L) of the led-through cables.

4. The cable lead-through according to claim 1, wherein the holes are formed as blind-bore holes or the recesses are formed as recesses that do not pass through the material of the longitudinal strip.

5. The cable lead-through according to claim 1, wherein the geometric dimensions or the shaping of the corresponding end-face ends of the spacer elements, pins and holes or insertion strips and recesses are formed in each case such that the inserted spacer elements have a tight fit in one of the longitudinal strips and have a looser fit in the other of the longitudinal strips.

6. The cable lead-through according to claim 5, wherein the corresponding pins and holes or insertion strips and recesses have in each case at least one sealing element, so that the inserted spacer elements have a tight fit in one of the longitudinal strips.

7. The cable lead-through according to claim 1, wherein intermediate bases are provided between the side strips or between two of the spacer elements or between one of the side strips and one of the spacer elements.

8. The cable lead-through according to claim 7, wherein the intermediate bases have recesses or holes similarly to the longitudinal strips.

9. The cable lead-through according to claim 7, wherein the intermediate bases between the side strips are fixedly connected thereto and form a further longitudinal strip, which has the recesses or holes at least on the two opposite sides facing the respective other longitudinal strips.

10. The cable lead-through according to claim 7, wherein the intermediate bases are shaped between two of the spacer elements or between one of the side strips and one of the spacer elements such that they cooperate form-fittingly in the direction of travel (L) of the cables with the spacer elements or with the spacer elements and the side strips.

11. The cable lead-through according to claim 1, wherein a side strip is provided at the end of each of the longitudinal strips such that the longitudinal strip and the side strip form an L, or the side strips in each case are provided one at each of the two ends of at least one of the longitudinal strips such that the longitudinal strip and the side strips form a U.

12. The cable lead-through according to claim 11, wherein the spacer elements are formed with different heights.

13. The cable lead-through according to claim 12, wherein the spacer elements with a height corresponding to the internal height of the frame have pins or insertion strips on both end faces, and in that the spacer elements with a shorter height have pins or insertion strips on one of the end faces.

14. The cable lead-through according to claim 1, wherein the spacer elements are waisted with at least one indentation in the direction of travel (L) of the inserted cables.

15. The cable lead-through according to claim 14, wherein the spacer elements are provided with a resilient sealing material in at least one of the indentations of their waisting.

16. The cable lead-through according to claim 1, wherein the spacer elements are convexly bulged in the direction of travel (L) of the inserted cables.

17. The cable lead-through according to claim 1, wherein each of the spacer elements is formed from at least two individual elements in the direction of travel (L) of the inserted cables.

18. The cable lead-through according to claim 1, wherein the recesses extend with a greater dimension in the direction of travel (L) of the inserted cables than perpendicular thereto and parallel to the longitudinal strips.

19. The cable lead-through according to claim 1, wherein the recesses are double-T-shaped.

20. The cable lead-through according to claim 1, wherein the spacer elements, the pins and the insertion strips are chamfered on their side facing the hole or recess.

21. The cable lead-through according to claim 2, wherein the spacer elements have a seal on their end face provided with the pins or insertion strips.

22. The cable lead-through according to claim 1, wherein the side strips are positioned perpendicularly on the longitudinal strips and the spacer elements run parallel to the side strips.

\* \* \* \* \*